US012698579B2

(12) United States Patent
    Christopherson

(10) Patent No.: US 12,698,579 B2
(45) Date of Patent: Aug. 4, 2026

(54) QUILTING RULER, QUILTING RULER SYSTEM, AND METHOD OF USE

(71) Applicant: KIMBERBELL KIDS, L.L.C., North Logan, UT (US)

(72) Inventor: Kimberly Christopherson, North Logan, UT (US)

(73) Assignee: KIMBERBELL KIDS, L.L.C., North Logan, UT (US)

( * ) Notice: Subject to any disclaimer, the term of this patent is extended or adjusted under 35 U.S.C. 154(b) by 808 days.

(21) Appl. No.: 17/401,793

(22) Filed: Aug. 13, 2021

(65) Prior Publication Data

US 2023/0018485 A1    Jan. 19, 2023

Related U.S. Application Data

(63) Continuation-in-part of application No. 29/799,889, filed on Jul. 16, 2021, now Pat. No. Des. 999,822.

(51) Int. Cl.
    *D05B 97/12*        (2006.01)
    *G01B 3/02*         (2020.01)
(52) U.S. Cl.
    CPC .............. D05B 97/12 (2013.01); G01B 3/02 (2013.01)
(58) Field of Classification Search
    CPC ............. D05B 97/12; G01B 3/02; A41H 3/01
    See application file for complete search history.

(56) References Cited

U.S. PATENT DOCUMENTS

| | | | | | |
|---|---|---|---|---|---|
| 5,191,716 | A | * | 3/1993 | Anderson | B43L 7/00 |
| | | | | | 33/483 |
| 5,511,316 | A | * | 4/1996 | Fischer | B26D 3/24 |
| | | | | | 33/562 |
| 5,577,328 | A | * | 11/1996 | Kerry, Sr. | G01B 3/14 |
| | | | | | 33/1 G |
| 6,460,267 | B1 | * | 10/2002 | Cormack | B43L 13/20 |
| | | | | | 33/565 |
| D549,115 | S | * | 8/2007 | Tucker | D10/64 |

(Continued)

OTHER PUBLICATIONS

Sewdirect, 4"x4" Embroidery Hoop fits Bernette Chicago 5 and 7, www.sewdirect.com, Jul. 21, 2021, https://www.sewvacdirect.com/4-x-4-embroidery-hoop-fits-bernette-chicago-5-and-7/.

(Continued)

*Primary Examiner* — Nathan E Durham
(74) *Attorney, Agent, or Firm* — Preston P. Frischknecht; Project CIP

(57) ABSTRACT

Embodiments of the present invention include a quilting ruler to facilitate home embroidery machine user's "quilting-in-the hoop" capabilities. This includes a thin, generally polygonal ruler with apertures for center marking, cross-hair marking, and size marking, as well as perimeters for edge markings to delineate fabric areas for quilting-in-the-hoop. The invention also includes a quilting ruler system with a plurality of such rulers of various dimensions and classes. Finally the invention includes a method of using the quilting rulers to map and extend quilting designs across a fabric area by selecting a quilting ruler, placing it on a fabric at a first fabric location, marking the fabric at the first fabric location through apertures, marking the fabric around the perimeter of the ruler, marking the dimension of the perimeter on the fabric, quilting at the first fabric location, and repeating these steps.

13 Claims, 9 Drawing Sheets

(56) References Cited

U.S. PATENT DOCUMENTS

| | | | |
|---|---|---|---|
| 7,255,051 | B2 | 8/2007 | Graham |
| 7,527,004 | B1 | 5/2009 | White |
| 7,568,295 | B1 * | 8/2009 | Strain .................... D05B 97/12 |
| | | | 33/566 |
| D601,442 | S | 10/2009 | Haren |
| 7,770,303 | B2 | 8/2010 | Graham |
| 7,854,073 | B1 * | 12/2010 | Webb .................... D05B 97/12 |
| | | | 33/1 G |
| 8,397,396 | B2 | 3/2013 | Nethery |
| 2004/0049935 | A1 * | 3/2004 | Tandy .................... D05B 97/12 |
| | | | 33/563 |
| 2008/0078094 | A1 * | 4/2008 | Baumann ................ B43L 7/027 |
| | | | 33/566 |
| 2009/0113737 | A1 * | 5/2009 | Graham .................. A41H 3/01 |
| | | | 33/562 |
| 2009/0288775 | A1 * | 11/2009 | Iwasaki .................... D06J 1/00 |
| | | | 156/443 |
| 2012/0204437 | A1 * | 8/2012 | Nethery ................. B43L 7/027 |
| | | | 33/566 |
| 2015/0337469 | A1 | 11/2015 | Bowman |

OTHER PUBLICATIONS

Westalee Design, Westalee Design 8 Point Crosshair Ruler (12. 5"x12.5"), www.amazon.com, Jul. 1, 2021, https://www.amazon. com/Westalee-Design-Point-Crosshair-Ruler/dp/B07MJCZTW4/.
Janome, 6 Point Crosshair Ruler, www.janome.com, Jul. 1, 2021, https://www.janome.com/accessories/sew-comfortable/6-point-crosshair-ruler/.
Creative Grids, Creative Grids 14-½in Square It Up or Fussy Cut Square Quilt Ruler—CGRSQ14, www.amazon. com, Jul. 1, 2021, https://www.amazon.com/Quilting-Template-Ruler-Square-Fussy/ dp/B005KBWYWQ.

* cited by examiner

QUILTING RULER, QUILTING RULER SYSTEM, AND METHOD OF USE

RELATED APPLICATIONS

This application is a continuation-in-part of, and claims priority to U.S. Design Patent Application Ser. No. 29/799,889, filed on Jul. 16, 2021.

BACKGROUND OF THE INVENTION

Embroidery is the art of working raised and ornamental designs in threads in a fabric with a needle. It is a traditional expression of human culture, history, and connection. Machine embroidery is a type of embroidery that uses a sewing or embroidery machine to create patterns on textiles. In recent years, the market for machine embroidery and machine embroidery accessories has grown based on: (a) increased use of home embroidery machines by domestic handlers; (b) scaling of entrepreneurship for retailers of embroidery machinery and accessories; and (c) advancements in manufacturing and product innovation. These trends are expected to continue, particularly the popularity of home machine embroidery.

Modern home embroidery machines are computer controlled and use software programs to increase user options and capabilities. In a typical home embroidery machine process, digital patterns are selected by a user and loaded into an embroidery machine. The area of the selected pattern must match the perimeter of a hoop which secures the fabric to be embroidered upon by the embroidery machine. The fabric is typically secured in the hoop with a backing and/or stabilizer and then placed on the machine. A needle is centered over the starting point of the design and a user initiates the embroidery machine and monitors as the machine sews the pattern onto the fabric within the hoop. The completed design is then removed from the machine.

Quilting is a related art that similarly reflects culture, history, and connection. It is a sewing technique in which two layers of fabric, usually with an insulating interior layer (or batting) are sewn together with multiple rows of stitching. Like embroidery, the stitching of quilting can incorporate various design elements and patterns. Most commonly, a machine known as a longarm quilting machine is used to quilt larger projects. However, longarm quilting machines are very large and expensive, and domestic handlers desire more accessible and less expensive quilting alternatives. So, home embroidery machines are occasionally used to quilt in addition to their main function of performing machine embroidery. One home embroidery machine quilting technique is known as "quilting-in-the-hoop." By quilting-in-the-hoop a user can create quilts in small sections (block by block or in strips) that correspond to the hoop size of the embroidery machine, and then extend the quilting incrementally over a fabric project.

Quilting-in-the-hoop presents specific challenges for home embroidery machine users, particularly in systematically extending quilting design across a large fabric. For example, very precise measurements must be made to ensure the alignment and connection of incrementally added, quilted sections. Moreover, if varying block sizes or patterns are desired on a larger fabric, it may become very difficult for a user to delineate different quilting areas on fabric and keep track of and match all of the different markings, hoops, designs, design files, and dimensions in order to successfully extend a custom quilting design across the fabric.

What is needed is a quilting ruler, quilting ruler system, and method of use to assist a home embroidery machine user to quilt in-the-hoop more easily and in a variety of ways, including, but not limited to, using various sizes of blocks and different patterns, so as to skillfully extend a custom quilting design across a fabric with a home embroidery machine and without use of a longarm quilting machine.

SUMMARY OF THE INVENTION

In accordance with the above, a new and innovative quilting ruler, quilting ruler system, and method of use is provided. The problem of enabling a home embroidery machine user to quilt in-the-hoop more easily and in a variety of ways is solved through: (a) a quilting ruler comprising a generally polygonal member with a center and a perimeter, a first non-elongate aperture located at the center; and a plurality of elongate apertures disposed at right angles between the center and the perimeter; (b) a quilting ruler system with a plurality of such rulers, including of various dimensions; and (c) a method of using the same. One embodiment of the method of use includes selecting a quilting ruler, placing it on a fabric at a first fabric location, marking the fabric at the first fabric location through apertures, marking the fabric around the perimeter of the ruler, marking the dimension of the perimeter on the fabric, quilting at the first fabric location, and repeating these steps to extend quilting design across a fabric.

These and other aspects of the present invention will become more fully apparent from the following description and appended claims or may be learned by the practice of the invention as set forth hereinafter.

BRIEF DESCRIPTION OF THE FIGURES

To further clarify the above and other aspects of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The drawings may not be drawn to scale. The invention will be described and explained with additional specificity and detail through the use of the accompanying drawings in which.

DETAILED DESCRIPTION OF THE ILLUSTRATED EMBODIMENT

The present invention in its various embodiments, some of which are depicted in the figures herein, is a quilting ruler, system, and method of use.

Figure 1:
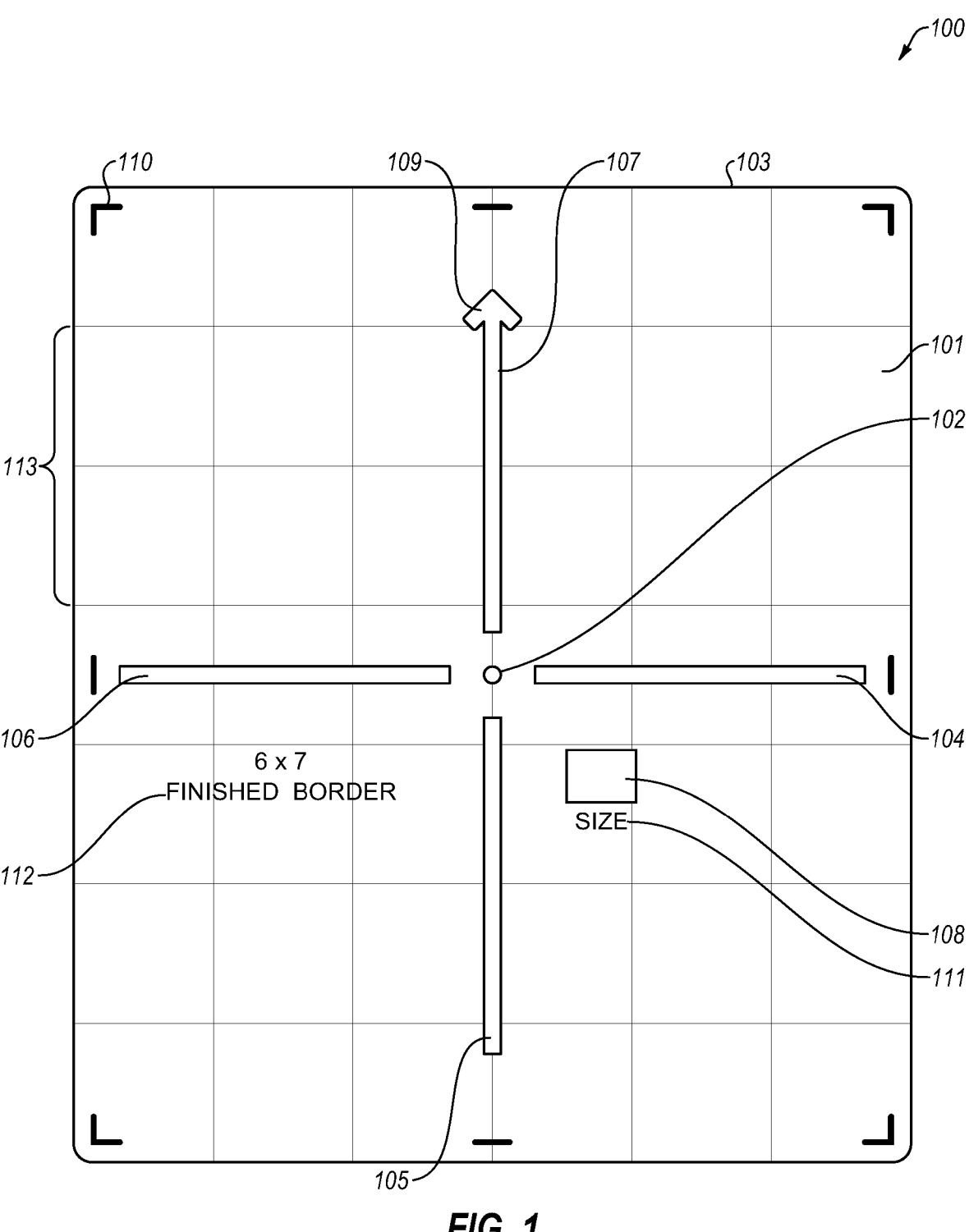
FIG. 1 is a top view of a quilting ruler.
Figure 2:
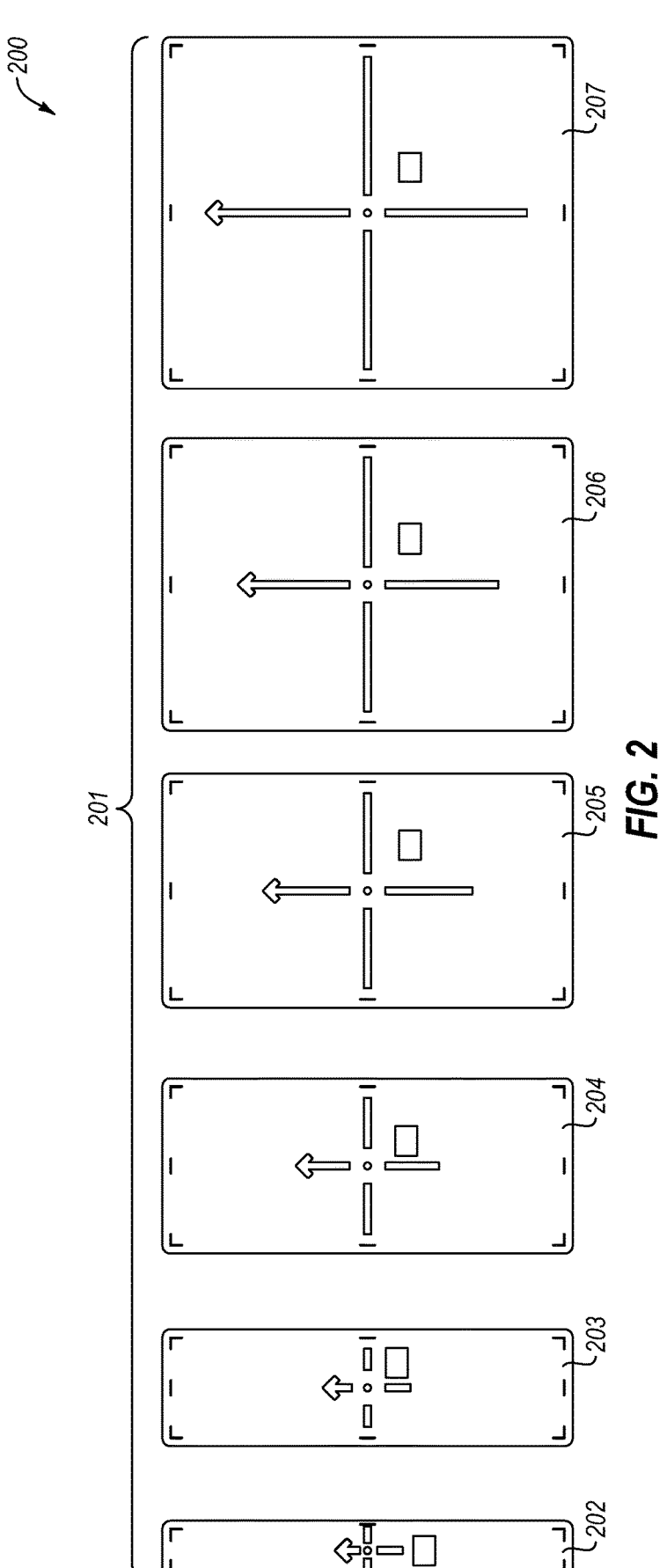
FIG. 2 is a top view of a first group of quilting rulers in a quilting ruler system.
Figure 3:
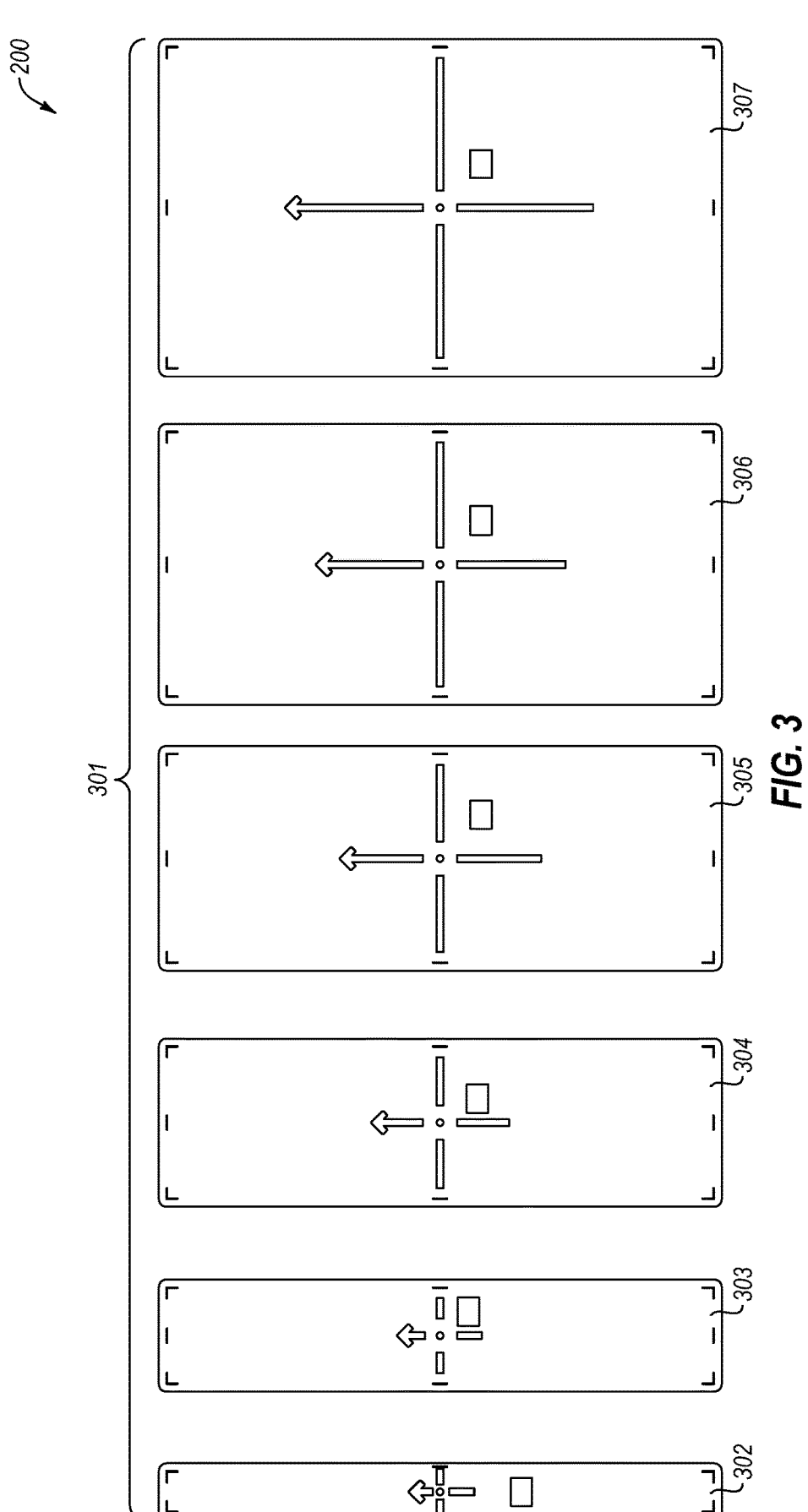
FIG. 3 is a top view of a second group of quilting rulers in a quilting ruler system.
Figure 4:
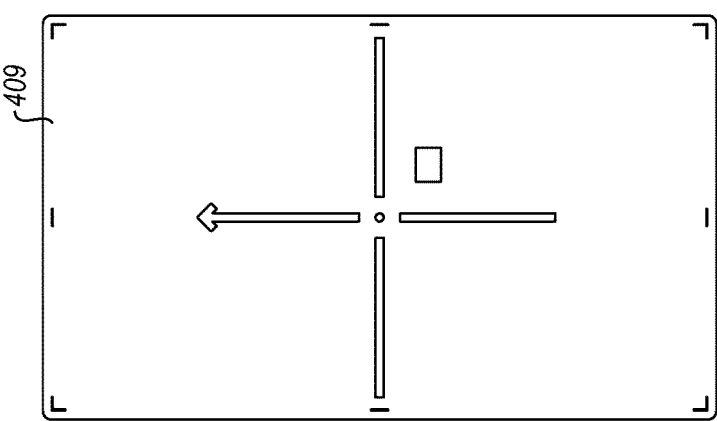
FIG. 4 is a top view of a third group of quilting rulers in a quilting ruler system.
Figure 4:
Figure 4:
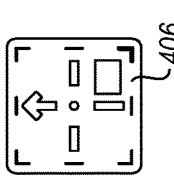
Figure 4:
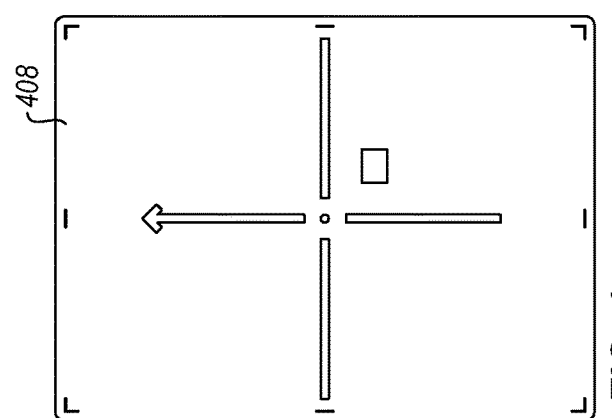
Figure 4:
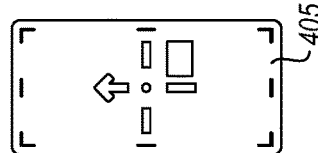
Figure 4:
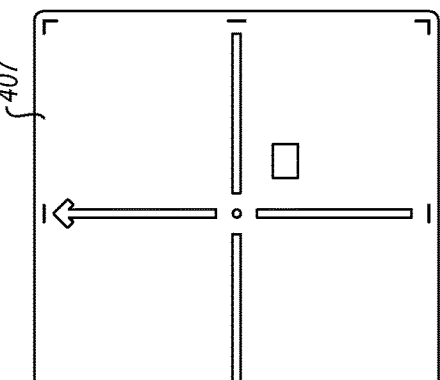
Figure 4:
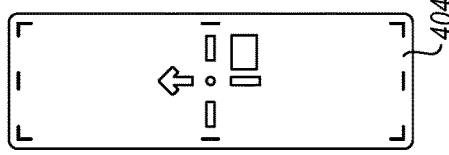
Figure 4:
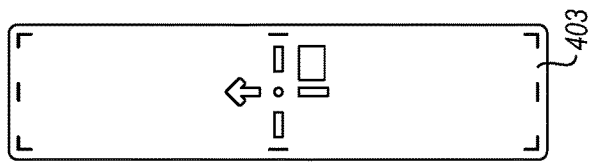
Figure 4:
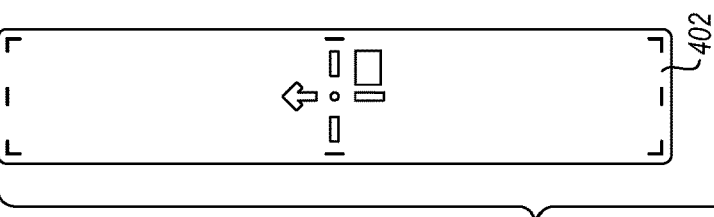
Figure 5:
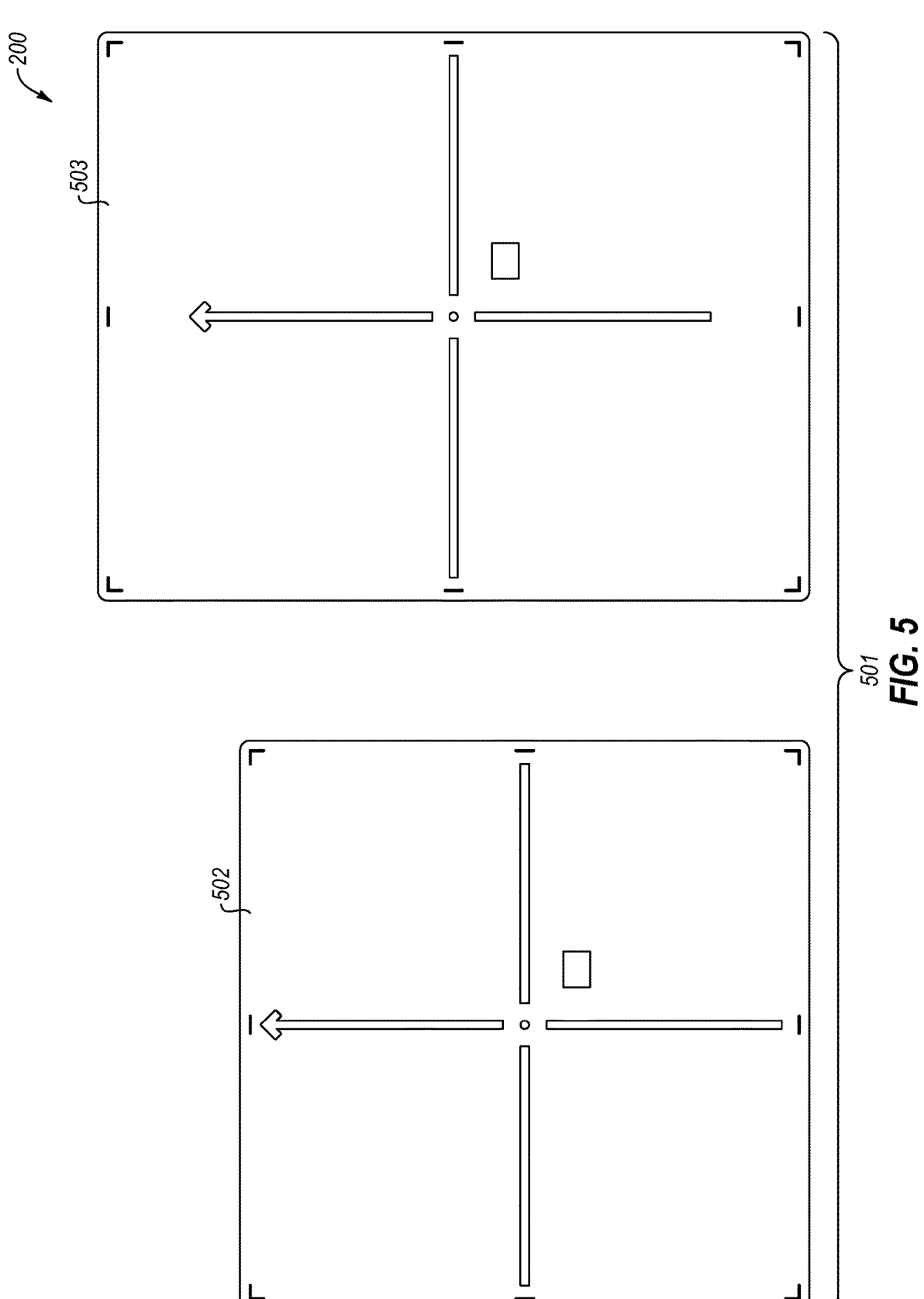
FIG. 5 is a top view of a fourth group of quilting rulers in a quilting ruler system.

Referring now to FIG. 1, a quilting ruler 100 is shown. Quilting ruler 100 is comprised of a generally polygonal member 101. Generally polygonal member 101 may be formed of a polymer such as, for example, polyvinyl chloride (PVC). In various embodiments, generally polygonal member 101 may be of a thickness less than 1 millimeter. The thickness of generally polygonal member 101 may also be less than 0.5 millimeter (e.g., in one embodiment less than 0.4 millimeter). Generally polygonal member 101 may be translucent, blue and/or flexible. Generally polygonal member 101 may incorporate a grid 113 of predetermined measure across its surface, comprised of, for example, 1-inch squares or similar common measurement.

The quilting ruler 100 has a center 102, a perimeter 103 following an outer edge, a first non-elongate aperture located at the center 102, and a plurality of elongate apertures 104, 105, 106, 107 disposed at right angles between the center 102 and the perimeter 103. One or more of the elongate apertures 107 within the plurality of elongate apertures 104, 105, 106, 107 terminates in an arrow shape 109. As set forth in more detail in method descriptions below, the arrow shape 109 is configured to indicate where the top of the hoop should be when a user is hooping fabric. Quilting ruler 100 has a second, non-elongate aperture 108 located between the center 102 and the perimeter 103. A first size indicator 111 may be located adjacent the second, non-elongate aperture 108. A second size indicator 112 that corresponds to the dimensions of the quilting ruler 100 may also be located on the embroider ruler 100. First and second size indicators 111, 112 are configured to indicate the size and/or dimensions of the quilting ruler 100. In various embodiments, quilting ruler 100 may also have corner 110 and/or side marks configured to reference outer marking locations, again, described in more detail in the method descriptions below. Significantly, quilting ruler is configured differently from an embroidery hoop template grid that may accompany and be and used with home embroidery machines. For example, quilting ruler is not configured to be attached to or used within the hoop in any manner.

Referring now to FIGS. 2-5, a system 200 incorporating various embodiments of the quilting ruler 100 is shown. System 200 is comprised of a plurality of quilting rulers (roughly 202 through 503 in the illustrated embodiment), each ruler having some or all of the features heretofore described. System 200 may include quilting rulers of different dimensions. For example, in the illustrated embodiment, a first class of quilting rulers 201, 301 in the system 200 generally corresponds to quilting and/or embroidery project widths of between 1 and 6 inches wide (for, e.g., borders designed to complement and frame the borders of a quilt) and may have one of the following dimensions (in inches): 1×7 (202), 2×7 (203), 3×7 (204), 4×7 (205), 5×7 (206), 6×7 (207), 1×10 (302), 2×10 (303), 3×10 (304), 4×10 (305), 5×10 (306), and 6×10 (307). A second class 401, 501 of quilting rulers in the system 200 corresponds to quilting and/or embroidery project block sizes (designed, e.g., to evenly fill the entire block area of a quilt and be tiled together to create an allover or custom quilting effect) may have one of the following dimensions: 2×2 (402), 2×4 (403), 2×6 (404), 2×8 (405), 2×10 (406), 4×4 (407), 4×6 (408), 4×8 (409), 8×8, 8×10, 6×6 (502), 6×8 (503), 6×10, 4×10. Of course, quilting rulers may have any dimension without departing from the purposes and scope of the invention. In various embodiments, the system also includes executable machine embroidery pattern or design files, software, and/or computer programs specific and size-corresponding to each ruler.

Figure 6:
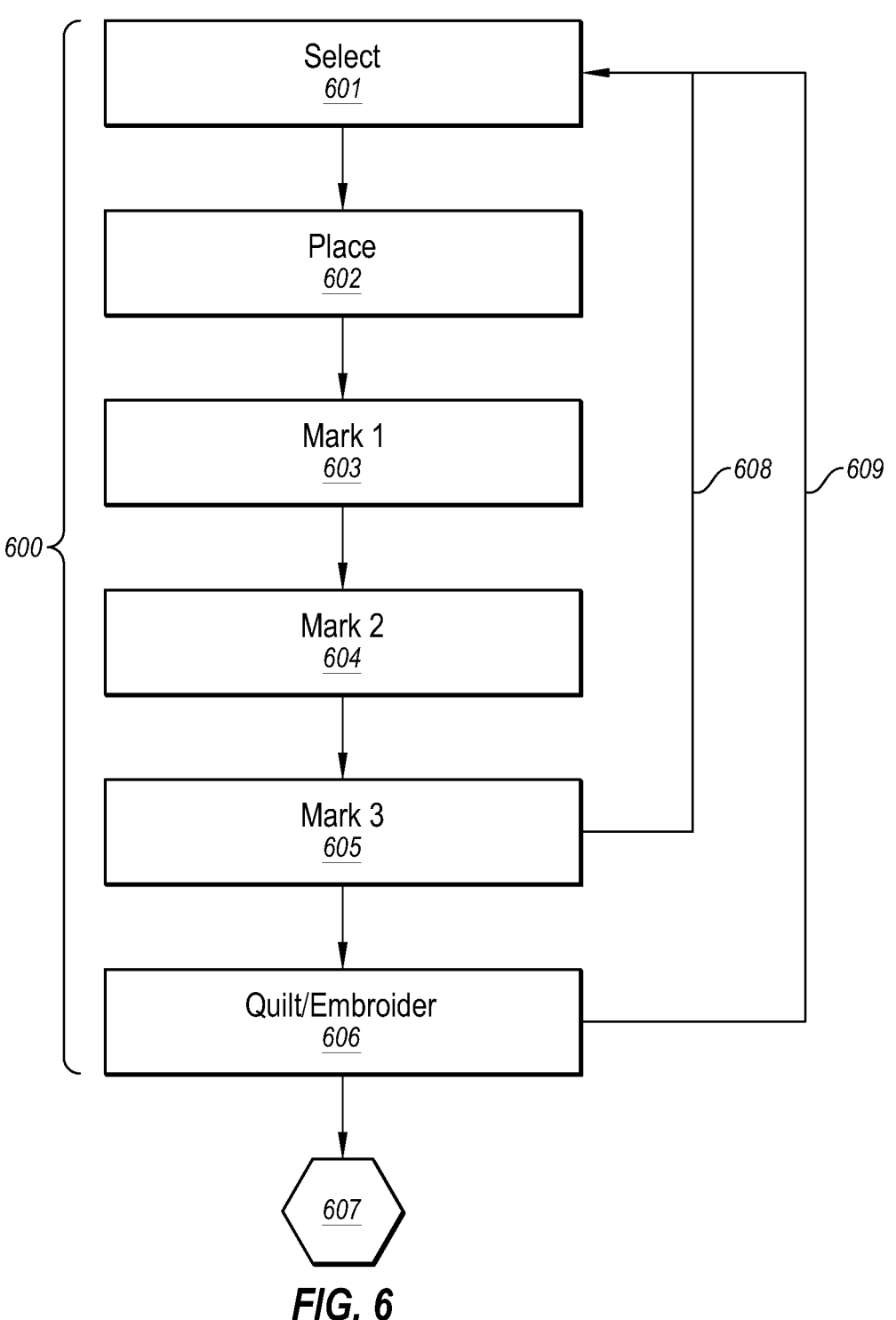
FIG. 6 is a block diagram of a first method of use for a quilting ruler and/or quilting ruler system.
Figures 7, 8:
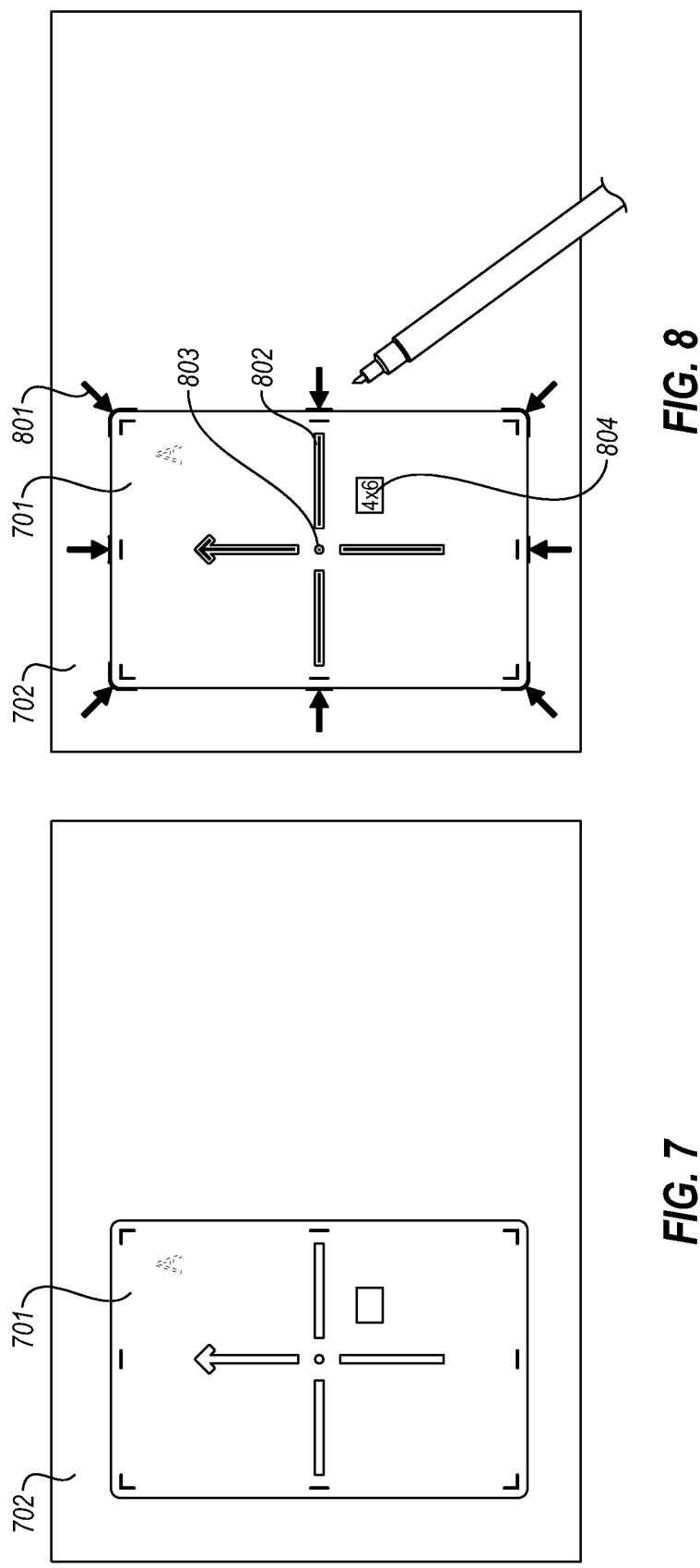
FIG. 7 is a top view of a quilting ruler placed on a fabric at a first fabric location within a first method of use for a quilting ruler and/or quilting ruler system.
FIG. 8 is a top view of a quilting ruler placed on a fabric being marked at a first fabric location within a first method of use for a quilting ruler and/or quilting ruler system.
Figures 9, 10:
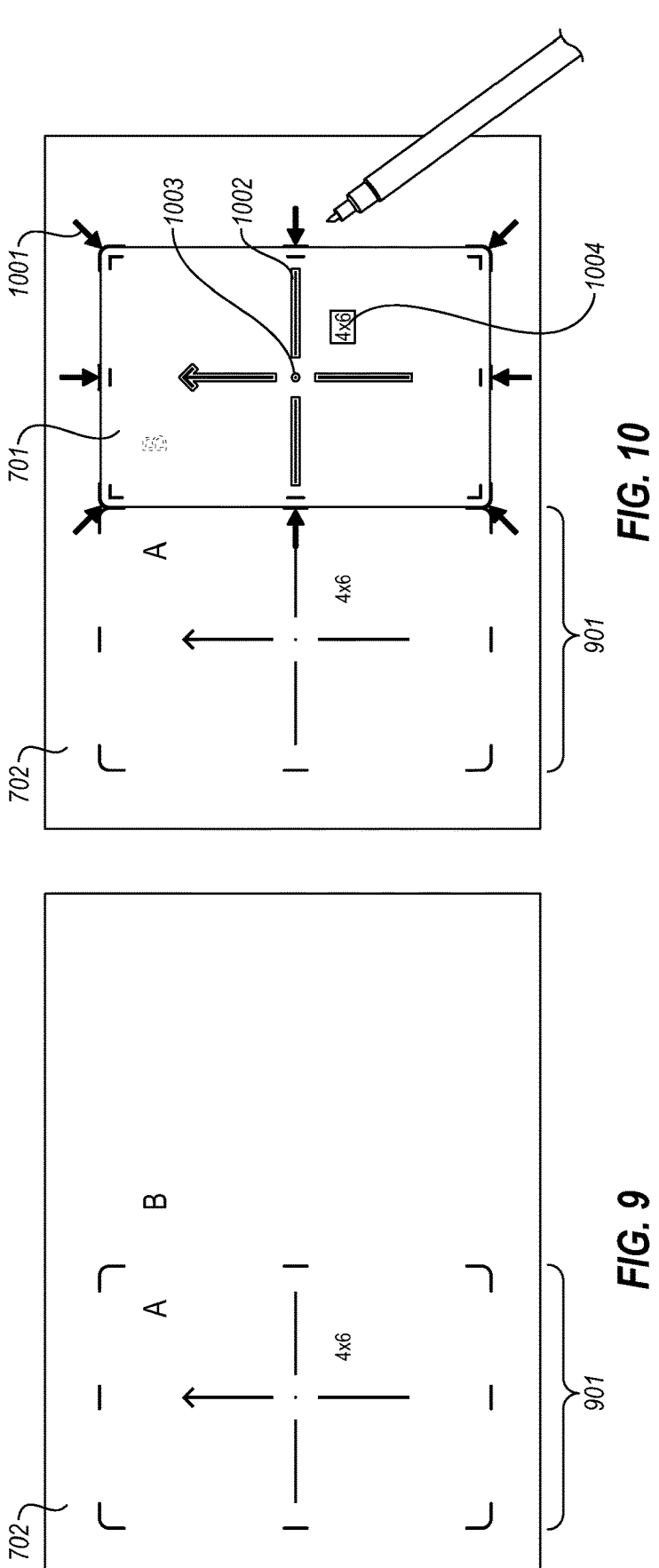
FIG. 9 is a top view of a fabric marked at a first fabric location through use of a quilting ruler within a first method of use for a quilting ruler and/or quilting ruler system.
FIG. 10 is a top view of a quilting ruler placed on a fabric and being marked at a second fabric location within a first method of use for a quilting ruler and/or quilting ruler system.
Figures 11, 12, 13:
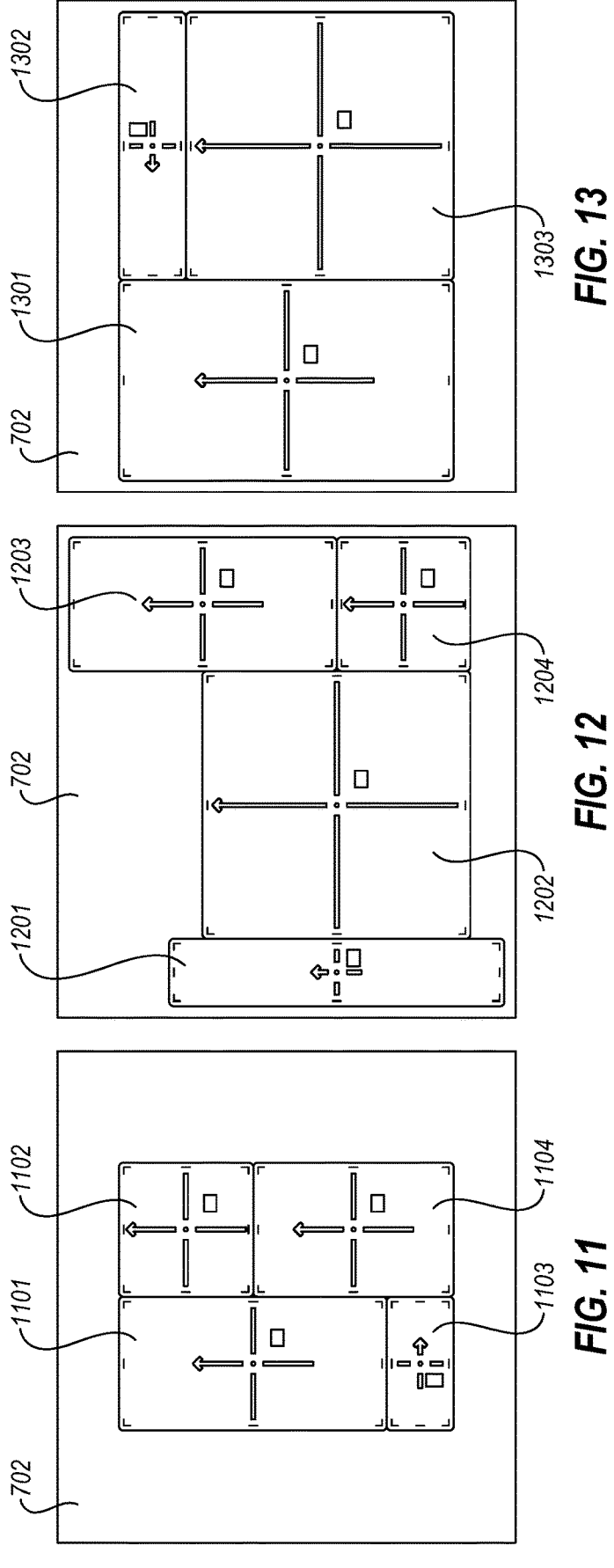
FIG. 11 is a top view of a first exemplary placement of quilting rulers within a plurality of quilting rulers on a fabric at different fabric locations within a method of use for a quilting ruler and/or quilting ruler system.
FIG. 12 is a top view of a second exemplary placement of quilting rulers within a plurality of quilting rulers on a fabric at different fabric locations within a method of use for a quilting ruler and/or quilting ruler system.
FIG. 13 is a top view of a third exemplary placement of quilting rulers within a plurality of quilting rulers on a fabric at different fabric locations within a method of use for a quilting ruler and/or quilting ruler system.

Referring now to FIG. 6, a method 600 of using a quilting ruler, quilting rulers, and/or quilting ruler system is shown. A first quilting ruler (e.g. 701 ) and/or quilting ruler from among the plurality of quilting rulers as set forth above is selected 601. The particular quilting ruler selected is based on user-preference variables such as size, dimension, class, and/or design. The first quilting ruler is placed on a fabric 702 at a first fabric location A 602 (see FIG. 7). The fabric is marked 802, 803 at the first fabric location A through the first non-elongate aperture and the elongate apertures 603 (see FIG. 8). The fabric is marked 801 at the first fabric location A around the perimeter of the quilting ruler to delineate a first area 604 (see 901 in FIGS. 8 & 9). The dimension of the perimeter is marked 804 on the fabric at the first fabric location A through the second non-elongate aperture 605 (see FIGS. 8 & 9). The fabric is then quilted and/or embroidered within the first area 606 with home machine embroidery equipment using quilting-in-the hoop techniques; alternatively, the steps are repeated at a second fabric location B 608, and so on, and quilting and/or embroidering is performed (again, using home machine embroidery equipment and quilting-in-the-hoop techniques) after a larger portion of or the entire project area has been marked (1001-1004) using the ruler and/or rulers. In preferred embodiments, the quilting and/or embroidery performed is a specific quilting design for joining two or more layers of fabric with multiple rows of stitching. In any event, the steps are repeated 609 to extend markings and quilting and/or embroidery design across the fabric. FIGS. 11-13 show varying combinations of rulers and placements thereof (e.g., 1101-1104, 1201-1204, 1301-1303) on a fabric 702 to achieve exemplary marking and quilting configurations using the method described above. At any point after a first round as set forth above, the method may stop 607.

By using the quilting ruler, rulers, and/or system outside of a home embroidery machine hoop, a user may incrementally mark fabric, align, and extend custom sewing design across a fabric area much larger than the otherwise limiting area of the hoop, and without using a long arm machine to do so. Moreover, using different dimensioned quilting rulers, a user can perform these operations to extend custom sewing design across a fabric in a way that incorporates elements that vary by the area delineated by the quilting rulers.

Referring now to FIGS. 11-13, exemplary ruler-on-fabric combination and/or configurations that allow for varied quilting designs are shown.

Thus configured, the problem of achieving a quilting ruler, quilting ruler system, and method of use to assist a home embroidery machine user to quilt in-the-hoop more easily and in a variety of ways—including, but not limited to, using various sizes of blocks and different patterns, so as to skillfully extend a custom quilting design across a fabric with a home embroidery machine and without use of a longarm quilting machine—is solved.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Because the embodiments above address the concept of quilting using an embroidering machine, the terms "quilt, quilting, embroidery, embroidery" are generally synonymous as used herein.

I claim:

1. A quilting ruler comprising:
a generally polygonal member with a center and a perimeter with opposite sides, each side having a midpoint;
a first non-elongate aperture located at the center; and
a plurality of elongate apertures disposed at right angles between the center and the perimeter, each elongate aperture generally inline with and between the midpoints of the opposite sides;
wherein an elongate aperture within the plurality of elongate apertures terminates in an arrow shape that points towards a top edge midpoint of the quilting ruler.

2. The quilting ruler of claim 1 further comprising a second non-elongate aperture located between the center and the perimeter wherein the second non-elongate aperture is larger than the first non-elongate aperture.

3. The quilting ruler of claim 1 the generally polygonal member formed of a translucent polymer.

4. The quilting ruler of claim 1 wherein the generally polygonal member is substantially flexible.

5. The quilting ruler of claim 1 configured to be used outside of an embroidery hoop.

6. A quilting ruler system comprising:
a plurality of quilting rulers, each quilting ruler having:
a generally polygonal member with a center and a perimeter with opposite sides, each side having a midpoint;
a first non-elongate aperture located at the center; and
a plurality of elongate apertures disposed at right angles between the center and the perimeter, each elongate aperture generally inline with and between the midpoints of the opposite sides;
wherein an elongate aperture within the plurality of elongate apertures terminates in an arrow shape that points towards a top edge midpoint of the quilting ruler; and
wherein the second non-elongate aperture is larger than the first non-elongate aperture.

7. The quilting ruler system of claim 6, wherein the plurality of quilting rulers is comprised of quilting rulers having different dimensions.

8. The quilting ruler system of claim 6, wherein each quilting ruler within the plurality of quilting rulers has a second non-elongate aperture located between the center and the perimeter.

9. The quilting ruler system of claim 6 the generally polygonal member formed of a translucent polymer.

10. The quilting ruler system of claim 6 wherein the generally polygonal member of each quilting ruler within the plurality of quilting rulers is substantially flexible.

11. The quilting ruler system of claim 6 wherein each quilting ruler within the plurality of quilting rulers is configured to be used outside of an embroidery hoop.

12. The quilting ruler system of claim 6, the generally polygonal member being less than 1 mm in thickness.

13. The quilting ruler system of claim 6, the generally polygonal member being less than 0.5 mm in thickness.

* * * * *